US009931693B2

(12) United States Patent
Horvath et al.

(10) Patent No.: US 9,931,693 B2
(45) Date of Patent: Apr. 3, 2018

(54) FILTERING CHECK VALVE FOR METAL CASTING

(71) Applicant: ASK CHEMICALS L.P., Wilmington, DE (US)

(72) Inventors: Lee R. Horvath, Powell, OH (US); Ronald C. Aufderheide, London, OH (US); Sam Nerone Ramrattan, Kalamazoo, MI (US); Sean B. Harmon, Columbus, OH (US)

(73) Assignee: ASK CHEMICALS LLC, Wilmington, DE (US)

( * ) Notice: Subject to any disclaimer, the term of this patent is extended or adjusted under 35 U.S.C. 154(b) by 66 days.

(21) Appl. No.: 14/939,530

(22) Filed: Nov. 12, 2015

(65) Prior Publication Data

US 2016/0067773 A1    Mar. 10, 2016

Related U.S. Application Data

(63) Continuation-in-part of application No. PCT/US2014/040120, filed on May 30, 2014.

(60) Provisional application No. 62/083,947, filed on Nov. 25, 2014, provisional application No. 61/828,741, filed on May 30, 2013.

(51) Int. Cl.
*B22D 17/32*    (2006.01)
*B22D 17/02*    (2006.01)
*B22D 17/28*    (2006.01)
*B22D 17/30*    (2006.01)
*F16K 15/06*    (2006.01)
*F16K 27/02*    (2006.01)

(52) U.S. Cl.
CPC ............ *B22D 17/32* (2013.01); *B22D 17/02* (2013.01); *B22D 17/28* (2013.01); *B22D 17/30* (2013.01); *F16K 15/06* (2013.01); *F16K 27/0209* (2013.01)

(58) Field of Classification Search
CPC ........ B22D 17/02; B22D 17/28; B22D 17/30; B22D 17/32; F16K 15/06; F16K 27/0209
USPC .......................... 164/303, 321, 133; 137/511
See application file for complete search history.

(56) References Cited

U.S. PATENT DOCUMENTS 5,092,499 A  *  3/1992  Sodderland ............ B22D 17/30
                                                    222/596
2005/0284600 A1 * 12/2005 Ilmonen ............... B22D 17/203
                                                    164/312

FOREIGN PATENT DOCUMENTS

WO          0126843 A1    4/2001

* cited by examiner

*Primary Examiner* — Kevin P Kerns
(74) *Attorney, Agent, or Firm* — Standley Law Group LLP

(57) ABSTRACT

A sleeve (10) allows flow against gravity of molten metal into a casting mold. The sleeve has a sleeve body (20) with a longitudinal axis that defines a flow conduit for the metal. A check valve (30) is positioned in the flow conduit, arranged for limited axial movement in the sleeve between a closed position and an open position, although it is operatively positioned to be in the closed position in the absence of the pressurized metal. The check valve has a spool (32) with an internal flow conduit, a top end of the conduit blocked by an end cap (40). Flanges (36, 38) on the spool provide the limited axial movement in the sleeve. When lifted into the open position, metal flows into the spool flow conduit and through a porous structure of the spool, causing laminar flow and filtering inclusions.

9 Claims, 7 Drawing Sheets

FILTERING CHECK VALVE FOR METAL CASTING

CROSS-REFERENCE TO RELATED APPLICATIONS

This application is a continuation-in-part of PCT application PCT/US2014/040120, filed on 30 May 2014, which is in turn a non-provisional of US provisional 61/828,741, filed 30 May 2013. This application is also a non-provisional of US provisional 62/083,947, filed on 25 Nov. 2014. A claim of priority is made to each of these applications and each is incorporated by reference as if fully recited herein.

TECHNICAL FIELD

The disclosed embodiments of the present invention relate to filtering check valves used in the casting of molten metal. In one embodiment, the filtering check valve is incorporated into a sleeve, allowing a positive cut-off of metal flow, particularly when the molten metal is forced upwardly against gravity into the mold. In other embodiments, the filtering check valve is directly embedded in the mold and moves between an open and a closed position.

BACKGROUND

When casting some metals, the reactivity of the metal produces oxide films and other inclusions that pose difficulties that are not encountered when casting less reactive metals. For example, the very reactive nature of oxygen with metallic aluminum, especially in the molten state, can result in oxide films that can be formed during the pour and then folded back onto themselves in the cast product. These so-called bifilms can lie behind most, if not all, of the casting problems associated with aluminum, including porosity, hot tears, low mechanical properties and corrosion initiation.

These concerns are not limited to aluminum. While casting certain steels, elements in the steel can also oxidize during the process, forming ceroxide inclusions that can result in low tensile strengths, low yield strengths, etc.

It is generally known to pour molten metal downwardly into the mold, using gravity. In such cases, known technology is used for the filling cup or sleeve used to introduce the molten metal. It may be desirable in some situations to provide a system in which a charge of the molten metal is pushed upwardly, that is, against the flow of gravity, into the mold. In these cases, the bi-directional flow provided by the known filling sleeve technology presents a problem, as the metal will drain out of the mold once the pushing force is removed.

In WO 01/26843, a check valve is disclosed for use with upwardly flowing molten metal in a casting operation, but that invention uses a spherical valve member that moves within a valve compartment. At the lower end of the valve compartment, the spherical valve member seats itself in a circular aperture that seals against downward flow. At the upper end of the valve compartment, the spherical valve member is stopped against a non-circular (typically, oval) aperture, but the incomplete fit allows upward flow in the open area between the spherical valve member and the non-circular aperture. Little or no filtering of the molten metal is provided by this method.

It is therefore an unmet advantage of the prior art to provide a filing cup or sleeve for use in pouring molten metal into a mold against the flow of gravity having a filtering check valve.

SUMMARY

This and other unmet advantages are provided by a sleeve for the flow of molten metal into a casting mold and a method for using the sleeve.

The sleeve comprises a sleeve body and a check valve, seated in a flow conduit for the molten metal provided in the sleeve body. In an open position of the check valve, molten metal flows, but in a closed position, molten metal does not flow through the sleeve. The sleeve body is comprised of a material that is refractory and impervious to the flow of the molten metal.

In a bottom-filling application, the sleeve is positioned so that gravity holds a valve body of the check valve in the closed position, but pressure of the metal against the direction of gravity is used to raise the valve body from the closed position into the open position.

Inside the sleeve, a means for limiting axial movement of the valve body in the flow conduit comprising co-acting elements disposed on the sleeve body and the valve body.

In some embodiments, the sleeve body has an area of reduced diameter in the flow conduit along the length of the sleeve body, and preferably a circumferential ledge that extends radially inward from an internal wall of the sleeve body, to provide the first element of the means for limiting axial movement.

The valve body of the check valve has a spool with a flow conduit along a longitudinal axis thereof, the flow conduit open at a first end of the spool, the spool having an external diameter smaller than the reduced diameter provided by the ledge. It also has first and second flanges. The first flange extends radially outwardly from the spool along the length of the spool and acts as a second element of the means for limiting axial movement by having an external diameter larger than the area of reduced diameter provided by the ledge. The second flange extends radially outwardly from the spool at a second end thereof and acts as a third element of the means for limiting axial movement by having an external diameter larger than the area of reduced diameter provided by the ledge.

Unlike the impervious body of the sleeve, the spool body is porous, so that molten metal entering the flow conduit of the spool is directed radially outward. When the check valve is in the open position, this radial flow raises the molten metal past the check valve.

In some embodiments of the sleeve, the second flange is provided by an end cap affixed into the spool at the second end thereof, the end cap closing off the spool flow conduit.

Some aspects of the invention are achieved by a method of molding a shaped part of metal. In a first step, a mold having a cavity shaped to provide the shaped part is positioned atop a heating chamber comprising a crucible containing a charge of a molten metal, with a sleeve as described above providing at least part of a flow conduit between the crucible and the mold cavity. In a second step, pressure imposed on the heating chamber raises the charge of molten metal into the mold cavity against the force of gravity through the sleeve, the pressure opening the check valve of the sleeve and allowing flow of the metal past the check valve. In a third step, the imposed pressure is stopped and the weight of the metal in the mold cavity is allowed to close the check valve, retaining the metal in the mold.

BRIEF DESCRIPTION OF THE DRAWINGS

A better understanding of the disclosed embodiments will be obtained from a reading of the following detailed descrip

DETAILED DESCRIPTION OF A PREFERRED EMBODIMENT

Figure 1:
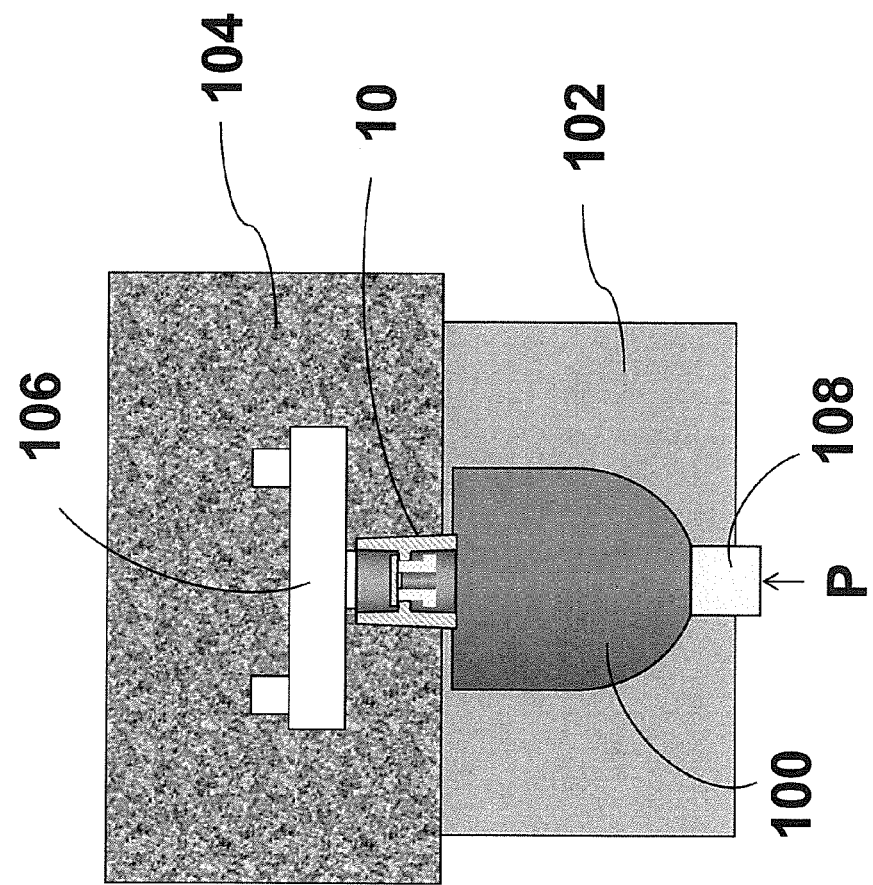
- FIG. 1 is a schematic section view of a system for filling a mold with molten metal from the bottom of the mold, including the sleeve described herein.

The embodiments of the inventive concept are best understood in association with a concept shown schematically in FIG. 1, which depicts a system for filling a mold from the bottom by pressurizing the molten metal into the mold against the flow of gravity. It is not the purpose of this application to describe all details of such a bottom-filling system or to claim such a system as the inventive object of this application. It is described to the extent provided so that the use of the sleeve described herein will be understood.

In FIG. 1, a charge of molten metal is prepared in a crucible 100 contained within a heating chamber 102. Atop the heating chamber 102 is a mold 104, in which a cavity 106 is provided to receive the molten metal charge. A sleeve 10, as will be more particularly described below, provides a flow conduit between the crucible 100 and the mold cavity 106. The heating chamber is modified with means 108, by which a pressure P is imposed on the crucible 100, causing the molten metal to be raised against the force of gravity into the cavity 106, by way of the sleeve 10. The pressure used to lift the metal also opens a check valve in the sleeve 10, allowing the flow. After the required amount of metal is transferred into the cavity 106 by pressure means 108, the pressure means is stopped and the weight of the metal already transferred into the cavity acts downwardly on the check valve, moving it to a closed position, preventing flow back into the crucible 100. From this point, the mold 104 may be separated from the heating chamber 102. Depending upon the specifics of how this is done, the sleeve 10 may or may not be retained with the mold 104.

Figure 2:
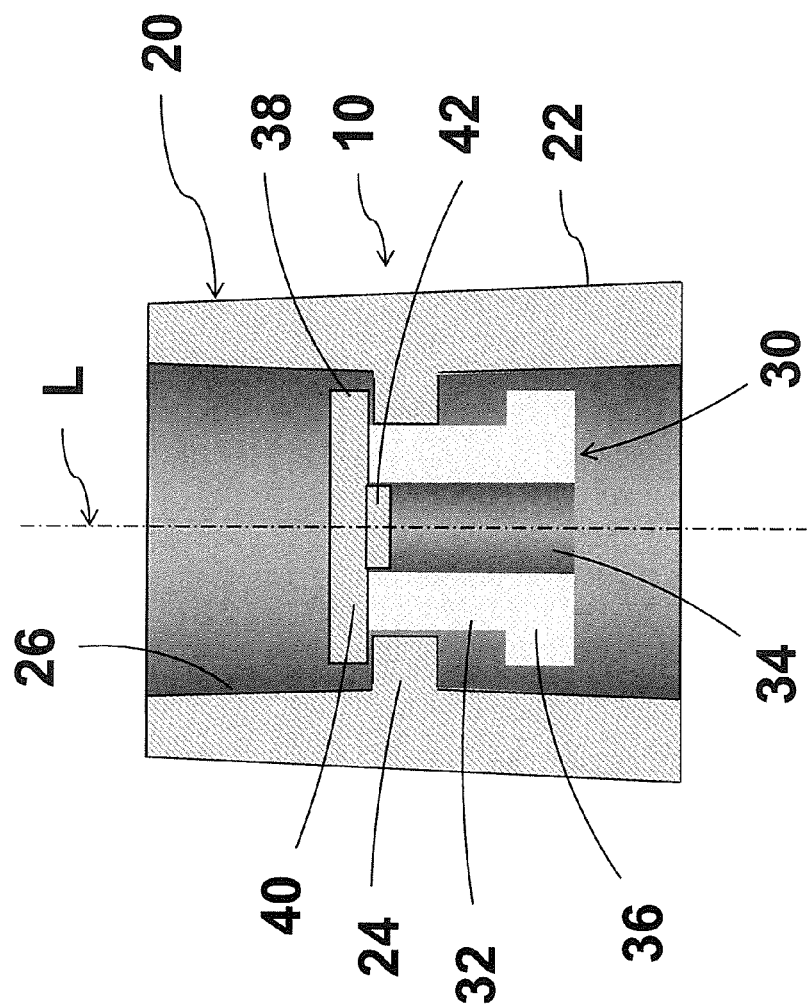
FIG. 2 is a side sectional view of an assembled embodiment of a sleeve, as used in a system such as the mold filling system of FIG. 1, with the sleeve in a closed position.

Referring now to FIG. 2, an embodiment of the sleeve 10 that would be useful in the system of FIG. 1 is disclosed in a side sectional view, with the sleeve in a closed position. The sleeve 10 comprises two interacting parts: a sleeve body 20 and a check valve 30. As depicted, an exterior surface 22 of the sleeve body 20 is generally cylindrical, but it may be somewhat frustoconical, with the external diameter decreasing from bottom to top, that is, decreasing in diameter in the direction of flow. In general, and with the specific exception of an area of reduced diameter provided by a shelf or ledge 24, the sleeve body 20 has a cylindrical interior surface 26 that defines a flow conduit for the molten metal. In most of these embodiments, the flow conduit is symmetrically arranged around a longitudinal axis L of the interior surface 26.

The sleeve body 20 will comprise a refractory material that will be appropriate for the intended use and this selection will be known from the prior art. The sleeve body 20 material will be inherently impervious to the molten metal, or it will be treated with a coating to render it impervious. Simply put, molten metal that enters one of the open ends should eventually exit through one of the open ends and should not exit by way of the sleeve wall to the exterior surface of the sleeve body 20.

In a particular embodiment shown in FIG. 2, the area of reduced diameter is provided by a circumferential ledge 24 or shelf that extends radially inward from the interior surface 26 of the sleeve body 20. This ledge 24 effectively reduces the diameter, and thus the cross-sectional flow area, of the conduit. More detail on this is provided below in the description of FIG. 4. Preferably, but not necessarily, ledge 24 is comprised of the same material as the sleeve body 20, and commonly, the ledge will be integrally formed with the sleeve body. In any case, the ledge 24 needs to be impervious to the molten metal to the same extent that the sleeve body 20 is impervious. All flow of molten metal past the ledge 24 should be through the area of reduced diameter and not axially through the body of the ledge.

The second of the interacting parts is the check valve 30, which is seated in the flow conduit, and particularly in the area of reduced diameter. The ledge 24 effectively limits the axial movement of check valve 30 between the closed position of FIG. 2 and the open position of FIG. 3. The sleeve 10 will be mounted in a system, such as the system of FIG. 1, so that the check valve 30 is normally in the closed position when the primary force acting on it is provided by gravity. A major component of the check valve 30 is a spool 32 that is constrained to limited axial movement along the longitudinal axis L of the sleeve 10. The spool 32 preferably has an internal flow conduit 34, which is open at a lower first end of the spool, but which is closed off at an upper second end. Along a majority of its body, the spool 32 has an external diameter that allows the axial movement within the area of reduced diameter, but the check valve 30 is capped at each of the ends of the spool by flanges 36, 38. Each of the flanges 36, 38 extends radially outwardly from the spool 32 along its length. One of the flanges 36, 38 can be integrally formed as a part of the spool. When one of the flanges 36, 38 is integrally formed, it will generally be preferred to have the flange 36, located at the open first end, to be the integral flange. The second flange 38 is preferably provided by an end cap 40 that is affixed into the spool 32 at the second end, closing that second end. In many of the embodiments, the end cap 40 may have a short cylindrical plug or stub 42, particularly one that is sized to provide an interference fit in the internal flow conduit 34. When provided, this stub 42 increases the amount of contact surface between the end cap 40 and spool 32 that can be used in affixing the parts.

End cap 40 will typically comprise a refractory material that will be appropriate for the intended use and this selection will be known from the prior art. The end cap 40 material will be inherently impervious to the molten metal, or it will be treated with a coating to render it impervious. To this extent, it is desirable for end cap 40 and sleeve body 20 to comprise the same impervious refractory material.

It will at this point be seen that the area of reduced diameter provided by ledge 24 of the sleeve body 20 and the flanges 36, 38 of the check valve 30 are examples of co-acting elements that provide a means for limiting the axial movement of the spool valve body in the flow conduit.

It has already been noted that the sleeve 10 will normally be in the closed position when the only force acting on the check valve 30 is gravity. It is now noted that when downward pressure from metal above the check valve 30 exceeds upward pressure imposed by a pressure means 108, then the check valve will also be in the position shown in FIG. 2. In this position, flange 38 lies directly atop the area 24 of reduced diameter. Flow in the downward direction is stopped.

However, when the upward force from pressure means 108 exceeds the combined downward forces acting on check valve 30, the flange 38 lifts off of the ledge 24 and the check valve lifts axially along the length of the spool 32 until, at a specific pressure, further upward movement is delimited by the interference of flange 36 with the ledge 24 of reduced diameter. This situation is depicted in side sectional view in FIG. 3, where the identification of all of the parts has already been provided in describing FIG. 2.

Unlike the sleeve body 20 and the end cap 40, spool 32 is preferably, if not necessarily, comprised of a porous material. The material chosen will be refractory and appropriate for the intended use and the porosity of the material may be either a natural property of the material or it may be the result of a manufacturing technique, such as a series of apertures. Looking at FIG. 3, the need for this porosity is seen. If the spool 32 is impervious to the same extent as the end cap 40 and the sleeve 10, no effective amount of metal flow will occur. However, with a porous body, the spool 32 allows the metal to flow axially into the internal flow conduit 34 and then to flow through the radial pathways that the spool provides.

At least two benefits are provided by this manner of flow. First, and to the extent defined by the average porosity, the material of spool 32 serves to filter the molten metal, retaining solids, particularly dross. Second, and not as obviously, change in direction and velocity imposed by the porosity tends to make the flow more laminar, which is believed to be desirable in preventing the creation of bifilms.

Figure 4:
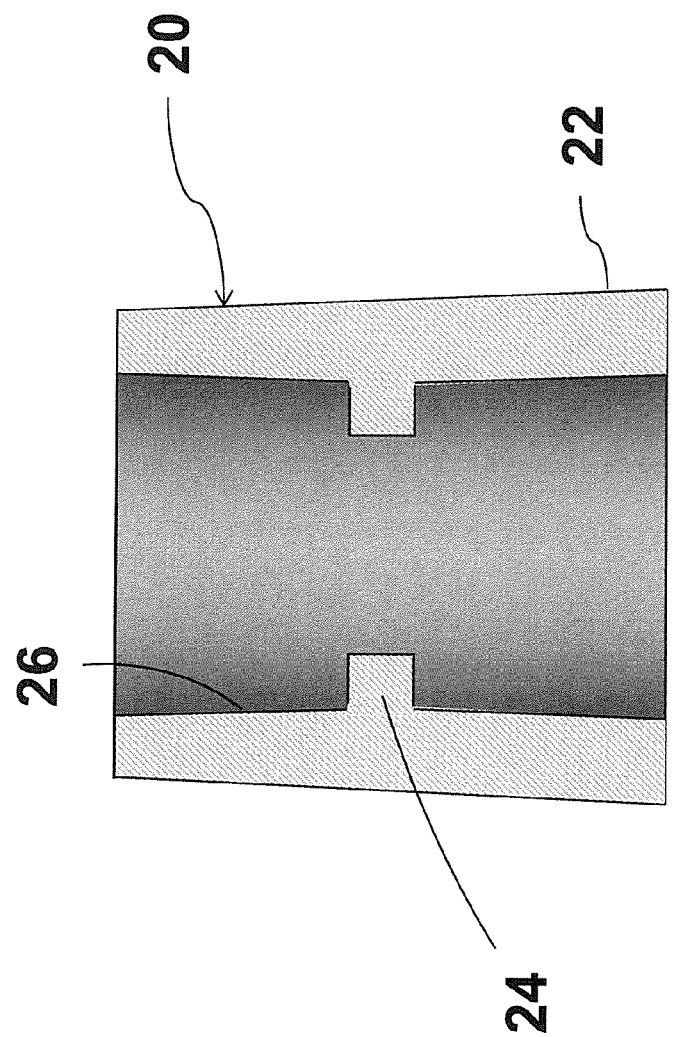
FIG. 4 is a side sectional view of a sleeve body of the FIG. 1 sleeve embodiment, isolated from a check valve.
Figure 5:
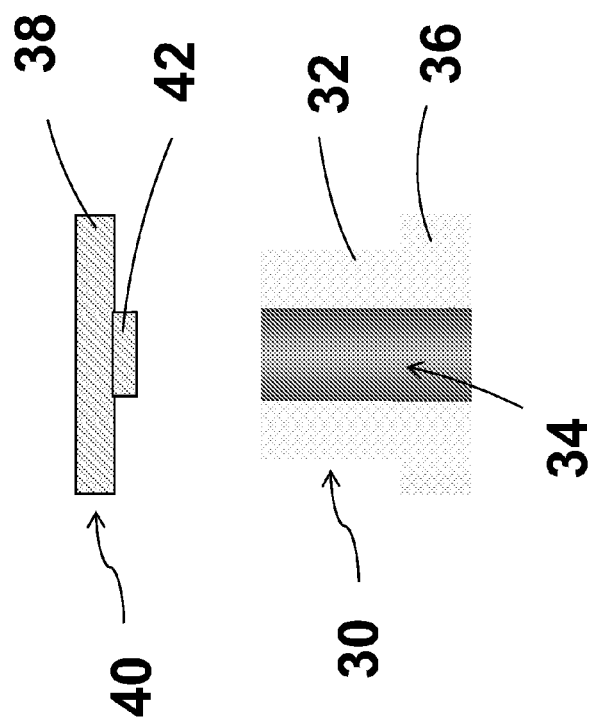
FIG. 5 is an exploded side sectional view of a check valve of the FIG. 1 sleeve embodiment, isolated from the sleeve body.

FIGS. 4 and 5 show the sleeve body 20 and the check valve 30, respectively, in side sectional isolation views, with FIG. 5 also showing the spool 32 and the end cap 40 in exploded view. All depicted parts have been identified in earlier figures and identical numbering is used in these figures.

Figure 3:
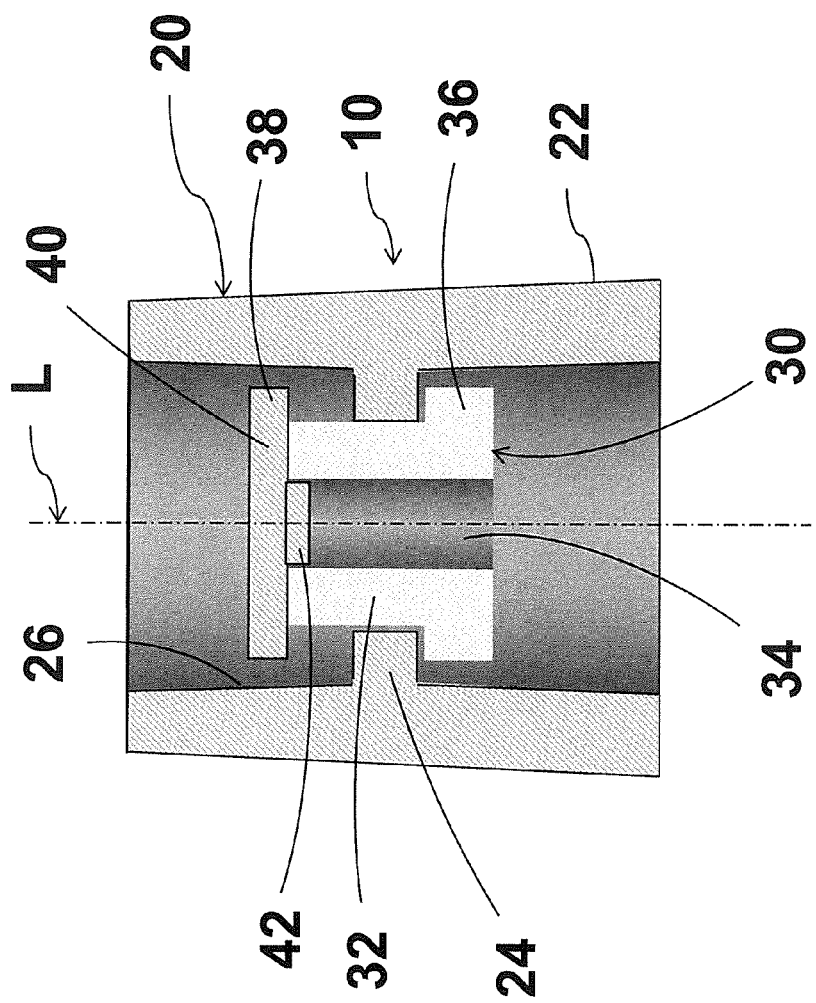
FIG. 3 is a side sectional view of the FIG. 1 sleeve embodiment, in an open position.

In general, the device 10 of FIGS. 2 and 3 will be used in a mold that parts horizontally, so the sleeve body 20 is necessary. However, there are instances where a vertically-parted mold may be used in an upward flow regimen. In such a case, the check valve 30 as taught above may be successfully implemented without the need for a sleeve body 20.

Figure 6:
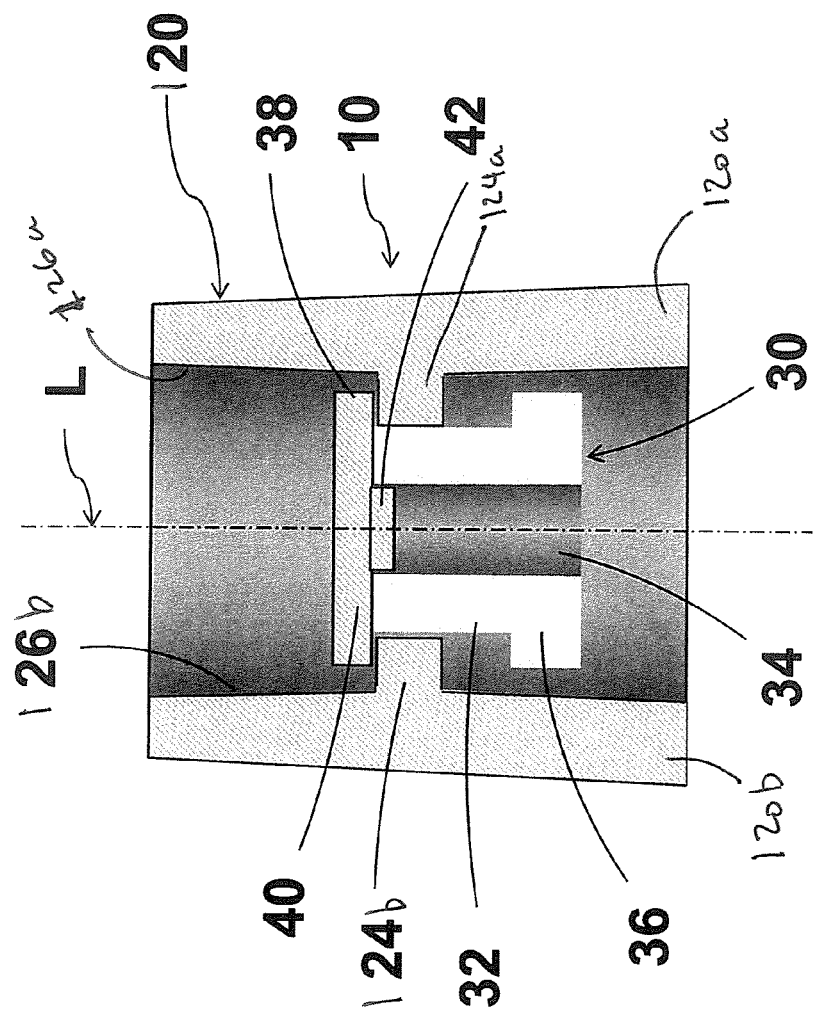
FIG. 6 is a side sectional view of an embodiment of a filtering check valve as in FIG. 2, using the mold halves to secure the filtering check valve in a closed position.

FIG. 6 shows a first example of how the inventive concept is implemented in a vertically-parted mold. As described previously with reference to FIG. 2, the check valve 30 is assembled from the spool 32 and the end cap 40, so that there is an internal flow conduit 34 and flanges 36, 38. Because spool 32 and end cap 40 will preferably differ significantly in porosity to achieve the filtering function, it is likely, although not required, that they be formed as separate pieces and then joined in a manner that will endure the heat encountered from the molten metal. As before, the end cap 40 can have a stub 42 that will be used to secure the end cap into the spool 32.

Still referring to FIG. 6, the longitudinal axis L of the check valve 30 can be arranged near, and preferably, along, a vertical parting line of the mold 120, which has first and second halves 120a, 120b. The area of reduced diameter (part 24 in FIG. 2) is replaced in FIG. 6 by a pair of such areas 124a, 124b, located, respectively, in mold halves 120a, 120b. Each of the mold halves 120a, 120b will have a surface 126a, 126b, so that the surfaces mate to form an interior surface of a flow conduit for the molten metal in which the check valve 30 is encountered.

In an embodiment of this type, the mold halves 120a, 120b can be formed using the known materials, such as green sand, chemically-bonded sand, using for example, phenolic, phenolic urethane, furan and sodium silicate binders, and metal, such as steel, with the surfaces 124a, 124b, 126a and 126b.

The FIG. 6 embodiment shows the device 30 in the closed position. The open position is not depicted, as it has already been disclosed in FIG. 3.

Figure 7:
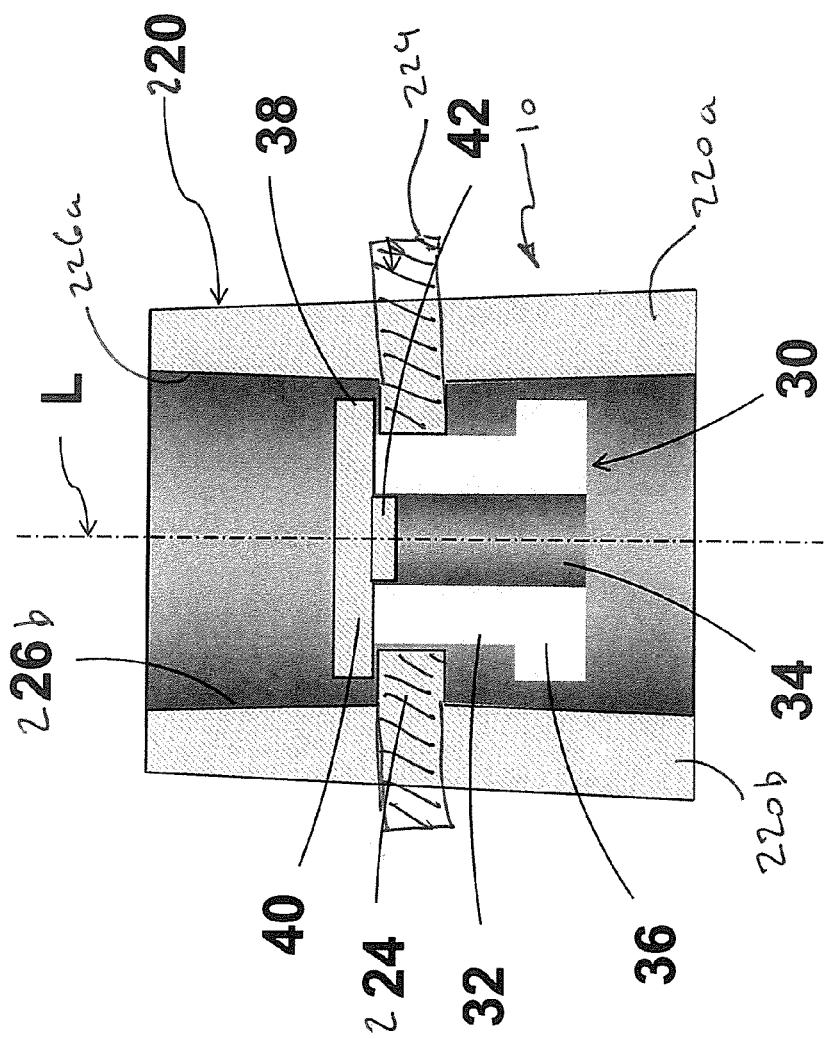
FIG. 7 is a side sectional view of another embodiment of a filtering check valve as in FIG. 2, using an annular ring in the mold halves to secure the filtering check valve in a closed position.

FIG. 7 shows a second example of how the inventive concept is implemented in a vertically-parted mold. As described previously with reference to FIG. 2, the check valve 30 is assembled from the spool 32 and the end cap 40, so that there is an internal flow conduit 34 and flanges 36, 38. Because spool 32 and end cap 40 will preferably differ significantly in porosity to achieve the filtering function, it is likely, although not required, that they be formed as separate pieces and then joined in a manner that will endure the heat encountered from the molten metal. As before, the end cap 40 can have a stub 42 that will be used to secure the end cap into the spool 32.

Still referring to FIG. 7, the longitudinal axis L of the filtering check valve 30 can be arranged near, and preferably, along, a vertical parting line of the mold 220, which has first and second halves 220a and 220b. Instead of forming (as in FIG. 6) the area of reduced diameter (part 24 in FIG. 2) from the same material as the mold (as in FIG. 6), the areas are provided by inserting an annular ring 224 into at least one of the mold halves 220a, 220b, so that the annular ring is embedded into each of the mold halves when they are mated to each other. Each of the mold halves 220a, 220b will have a surface 226a, 226b, so that the surfaces mate to form an interior surface of a flow conduit for the molten metal in which the check valve 30 is encountered. The annular ring 224, when used, will be substantially non-porous, so that the molten metal is required to flow through the tortuous path established by spool 32. The annular ring 224 can be formed from a variety of materials that will withstand the temperatures encountered, including a suitable metal, but a ceramic formulation may be preferred.

In an embodiment of this type, the mold halves 220a, 220b can be formed using the known materials, such as green sand, chemically-bonded sand, using for example, phenolic, phenolic urethane, furan and sodium silicate binders, and metal, such as steel.

The FIG. 7 embodiment shows the device 30 in the closed position. The open position is not depicted, as it has already been disclosed in FIG. 3.

What is claimed is:

1. A sleeve for the flow of molten metal into a casting mold, comprising:
   a sleeve body, having a longitudinal axis, along which is defined a flow conduit for the molten metal; and
   a valve body, seated for limited axial movement between a closed position and an open position in the flow conduit of the sleeve body, wherein a portion of the valve body operates as a filter to metal passing therethrough when in the open position, the valve body comprising:

a spool, comprising a porous material, with a flow conduit along a longitudinal axis thereof and radially outwardly through the porous material, the flow conduit open at a first end of the spool;

a first flange, extending radially outwardly from the spool along the length thereof, the first flange providing an external diameter larger than an external diameter of the spool; and a second flange, extending radially outwardly from the spool at a second end thereof, the second flange having an external diameter larger than the external diameter of the spool.

2. The sleeve of claim 1, wherein:
the valve body is operatively positioned to normally be in the closed position.

3. The sleeve of claim 2, wherein:
pressure of the molten metal against the operatively positioned valve body raises the valve body from the closed position into the open position.

4. The sleeve of claim 1, wherein:
the sleeve body further comprises an area of reduced diameter in the flow conduit along the length of the sleeve body.

5. The sleeve of claim 4, wherein:
a circumferential ledge that extends radially inward from an internal wall of the sleeve body provides the area of reduced diameter of the flow conduit.

6. The sleeve of claim 5, wherein:
the limited axial movement of the valve body in the flow conduit of the sleeve body is provided by the co-action of the circumferential ledge, as the area of reduced diameter has an internal diameter that is larger than the external diameter of the spool body and is smaller than the external diameter of both the first flange and the second flange.

7. The sleeve of claim 1, wherein:
the second flange is provided by an end cap affixed into the spool at the second end thereof, the end cap closing off the flow conduit of the spool.

8. The sleeve of claim 1, wherein:
in cases in which the casting mold is parted vertically into mold halves, the sleeve body comprises first and second sleeve halves, the sleeve halves positioned in the respective mold halves; and an annular ring, embedded into each of the mold halves when the parted mold halves are mated to each other, serves to align the valve body for limited axial movement between the mold halves.

9. A method of molding a shaped part of metal, comprising the steps of:

positioning a mold having a cavity shaped to provide the shaped part atop a heating chamber comprising a crucible containing a charge of a molten metal, with a sleeve according to claim 1 providing at least part of a flow conduit between the crucible and the mold cavity;

imposing pressure on the heating chamber to raise the charge of molten metal into the mold cavity against the force of gravity through the sleeve, the pressure opening the valve body of the sleeve; and stopping the imposed pressure, allowing the weight of the metal in the mold cavity to close the valve body.

* * * * *